(No Model.)
P. BOUTILIER.
FAUCET.
No. 597,631.                    Patented Jan. 18, 1898.
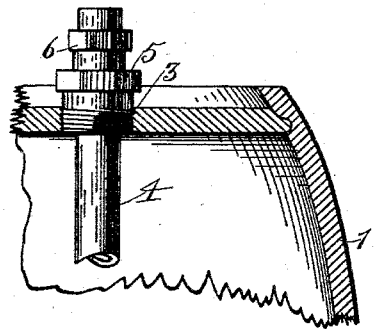
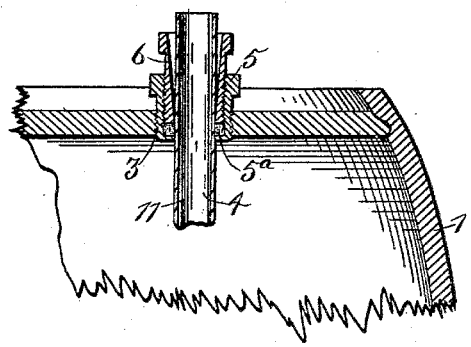
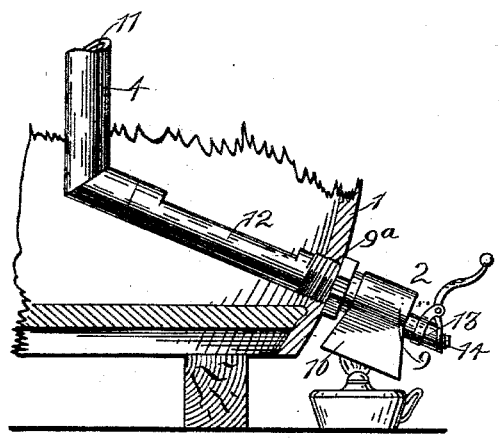
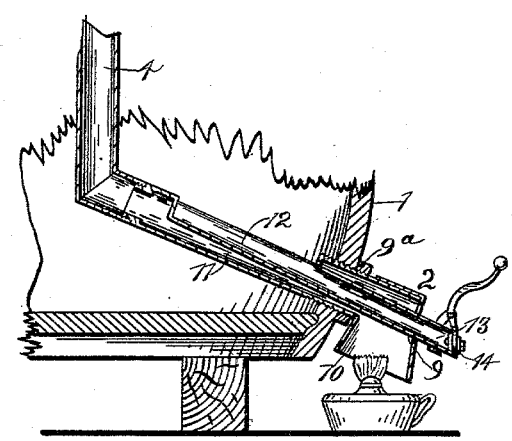
Fig. 1.                          Fig. 2.
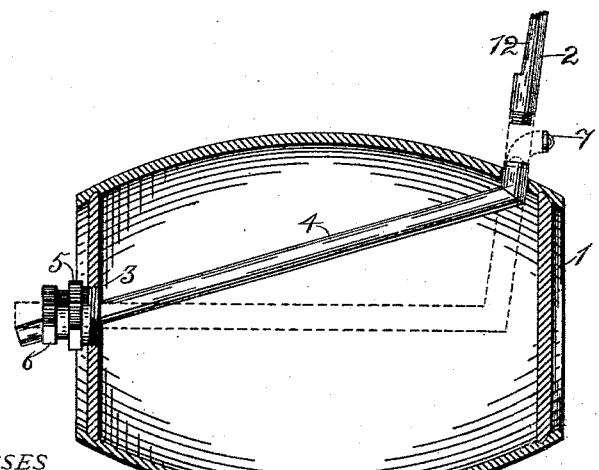
Fig. 3.
WITNESSES                                INVENTOR

UNITED STATES PATENT OFFICE.

PETER BOUTILIER, OF BRITT, IOWA.

FAUCET.

SPECIFICATION forming part of Letters Patent No. 597,631, dated January 18, 1898.

Application filed March 24, 1897. Serial No. 628,969. (No model.)

*To all whom it may concern:*

Be it known that I, PETER BOUTILIER, a citizen of the United States, residing at Britt, in the county of Hancock and State of Iowa, have invented certain new and useful Improvements in Faucets; and I do hereby declare the following to be a full, clear, and exact description of the invention, such as will enable others skilled in the art to which it appertains to make and use the same.

My invention relates to certain new and useful improvements in faucets, and particularly to that class used in connection with barrels or other receptacles which contain lubricating-oils, syrups, molasses, and similar liquids which are liable to become thickened through exposure to cold or through process of evaporation; and the object of my invention is to provide a faucet of this character which is so constructed that liquids having the tendencies above referred to will not be retarded in their flow from the faucet, but, on the contrary, will under any atmospheric or other conditions permit of a more ready flow thereof.

To this end my invention comprises certain novel features of construction and arrangement of parts whereby the above and other important advantages are gained in a simple and inexpensive manner, as will be hereinafter fully described, and specifically pointed out in the appended claims.

In the accompanying drawings, Figure 1 is a longitudinal section through a barrel, showing my improved faucet in elevation. Fig. 2 is a similar section of a barrel, showing the device in section also; and Fig. 3 is a similar section of a barrel, showing the method of applying my improved faucet thereto.

Similar reference-numerals indicate corresponding parts in the figures of the drawings.

1 represents a barrel, and 2 my improved faucet connected therewith.

The head of the barrel is provided, as shown, with a suitable opening 3 for the accommodation of an elbow-pipe 4. A gland 5, provided with a suitable gasket or packing $5^a$, is placed upon the elbow-pipe 4, the threaded end of which gland is screwed into the opening 3 of the barrel-head, and this gland 5 is provided with interior threads to receive the threaded end of another gland 6, which is adjusted to bring its inner end into contact with the packing or gasket $5^a$, by which means a perfectly tight joint is secured. It will be observed that the opening at the inner end of the gland 6 is just large enough to freely admit the elbow-pipe 4, and the inner face of the gland gradually tapers toward the outer end, where it is somewhat larger in diameter, thus permitting of a slight play in any direction of the elbow-pipe 4.

The extreme end of the elbow-pipe 4 is provided with interior threads to receive the threaded end of the faucet 2, at which end a button 7 is arranged. The object of this button is to close the end of the elbow 4, so as to prevent the entrance therein of the liquid while the elbow is being adjusted to the barrel, and it is removed when the faucet is in position to connect with the elbow.

My improved faucet comprises an outer shell 9, partially cylindrical in form, having one end threaded, and this end is adapted to enter the barrel through an opening $9^a$ in the side thereof and engage the internal threads of the elbow 4, above referred to, and the outer end of this shell 9 is provided with a hood 10, which communicates with and forms a passage or hot-air flue 11, which leads through the hood and the elbow-pipe 4. The said shell 9 intermediate of its ends is bent or depressed inwardly and downwardly to form a longitudinal trough or channel 12, and between the inner walls of this depressed portion and the inner wall of the shell 9 the hot-air flue or passage above referred to will be substantially U-shaped in transverse section. The inner end of this trough or channel is closed, from which point it gradually deepens toward its outer end, where it connects with a pipe 13, which latter passes out through the hood, and it is by means of this pipe that the liquid passes out from the interior of the barrel, a suitable valve 14 being arranged upon the outer end of said pipe to normally prevent the outflow of the liquid. The shell 9 is further provided with a threaded intermediate portion 15, adapted to engage in the opening $9^a$ of the barrel 1 and thus secure the faucet in place.

The valve 14 is carried on the end of a bent arm pivotally connected to the outer end of the pipe 13, the outer extremity of the said arm being provided with a counterpoise or weight 17, which serves to keep the valve normally in engagement with the pipe 13.

I contemplate using in connection with my improved faucet an ordinary lamp or gasolene-burner or any other suitable source of heat, which in practice I place directly underneath the hood 10, the flue or passage 11 serving to carry off the products of combustion, and the heat arising from the flame will also pass into and through the flue or passage 11, thus heating it thoroughly and keeping the oil, syrup, or molasses, &c., in a thin liquid condition, which permits of its ready flow from the faucet.

In applying my invention to barrels the barrel is turned upon one end and the bent end of the elbow-pipe is inserted through the opening 3, bored for that purpose. The glands are placed in the pipe and screwed tight. The barrel is now turned on its side and the opening $9^a$ bored therein, as nearly as possible opposite the end of the elbow. A reference to Fig. 3 of the drawings will show clearly that after said opening has been made the elbow is moved to project therethrough. The stopper is now withdrawn and the faucet proper is next screwed on the elbow with one or two turns. Finally the elbow is pushed back and the faucet proper is screwed into the opening $9^a$, this operation completing at the same time the connection of the elbow with the faucet. The barrel may now be re-replaced upon its end and the heat applied.

It will thus be seen that my invention provides in a simple and inexpensive manner a faucet that is well adapted for the purposes for which it is intended and one that can be easily applied to the barrel and readily removed when the contents of the barrel have become exhausted, and so applied to another fresh barrel.

Having thus described my invention, what I claim, and desire to secure by Letters Patent, is—

1. A faucet for the purposes described comprising a shell provided with open ends and its intermediate portion being bent or depressed to form a trough or channel for the outflow of the liquid, and an elbow-pipe adapted to engage the inner end of said shell and form a flue therein, substantially as described.

2. A faucet for the purposes described comprising a shell one end being provided with a hood and the other end with threads, the intermediate portion of said shell being bent or depressed to form a trough or channel, a pipe connecting with said channel or trough for the outflow of the liquid, and an elbow-pipe having its end threaded to engage the threaded end of the shell, and glands to secure the said elbow-pipe in place, substantially as described.

3. A faucet for the purposes described, comprising a shell having a hood formed upon one end, and threads at the other end, and being further provided with threads intermediate of its length, the said shell being bent or depressed to form an inclined trough or channel, a pipe provided with a valve connecting with said channel, and an elbow-pipe adapted to engage the end of the shell above referred to, to form a hot-air flue leading from said hood to the free extremity of the elbow, with glands to fit said pipe and secure it to the barrel, the inner gland being formed with an enlarged interior face at one end to give play to the elbow-pipe, and means to give heat to the hot-air flue, substantially as described.

In testimony whereof I have signed this specification in the presence of two subscribing witnesses.

PETER BOUTILIER.

Witnesses:
CLARA FITZSIMMONS,
A. I. VICKERMAN.